(12) United States Patent
Tschida et al.

(10) Patent No.: US 10,938,266 B2
(45) Date of Patent: Mar. 2, 2021

(54) ELECTRICAL MACHINE WITH COOLING CHANNEL

(71) Applicant: ABB Schweiz AG, Baden (CH)

(72) Inventors: Colin E. Tschida, Durham, NC (US); Sheng Zhong, Hillsborough, NC (US); Darren D. Tremelling, Apex, NC (US); Dariusz Bednarowski, Cracow (PL)

(73) Assignee: ABB Schweiz AG, Baden (CH)

( * ) Notice: Subject to any disclaimer, the term of this patent is extended or adjusted under 35 U.S.C. 154(b) by 175 days.

(21) Appl. No.: 16/234,290

(22) Filed: Dec. 27, 2018

(65) Prior Publication Data
US 2020/0212754 A1 Jul. 2, 2020

(51) Int. Cl.
*H02K 5/20* (2006.01)
*H02K 5/08* (2006.01)
*H02K 9/19* (2006.01)

(52) U.S. Cl.
CPC .............. *H02K 5/20* (2013.01); *H02K 5/08* (2013.01); *H02K 9/19* (2013.01)

(58) Field of Classification Search
CPC ............... H02K 5/08; H02K 5/20; H02K 9/19
USPC ............................................................ 310/54
See application file for complete search history.

(56) References Cited

U.S. PATENT DOCUMENTS

| | | | | |
|---|---|---|---|---|
| 3,619,674 A | * | 11/1971 | Daimo | H02K 1/20 310/14 |
| 5,081,382 A | * | 1/1992 | Collings | H02K 3/50 310/260 |
| 7,589,441 B2 | * | 9/2009 | Kalsi | H02K 1/12 310/180 |
| 2006/0043801 A1 | * | 3/2006 | Adra | H02K 3/24 310/54 |
| 2006/0279162 A1 | * | 12/2006 | Achor | H02K 11/215 310/239 |
| 2007/0013241 A1 | * | 1/2007 | Schiferl | H02K 1/32 310/54 |
| 2008/0012436 A1 | * | 1/2008 | Neal | H02K 1/04 310/54 |
| 2008/0017354 A1 | * | 1/2008 | Neal | H02K 9/19 165/104.14 |

(Continued)

FOREIGN PATENT DOCUMENTS

EP 1727263 A2 11/2006

*Primary Examiner* — Alex W Mok
(74) *Attorney, Agent, or Firm* — Taft Stettinius & Hollister LLP

(57) ABSTRACT

An electrical machine comprises a polymeric housing formed by a polymeric material and constructed to house components of the electrical machine, structurally support the electrical machine and react torque loads generated by the electrical machine; a stator overmolded into and partially encapsulated by the polymeric housing, the stator including a laminated stator core and a plurality of stator windings, the stator windings including a winding overhang extending from the laminated stator core; a rotor in magnetic communication with the stator; and a cooling channel disposed within the polymeric material forming the housing and encapsulated by the polymeric material and positioned adjacent to the laminated stator core, wherein the cooling channel is constructed to pass a fluid for cooling the electrical machine.

20 Claims, 2 Drawing Sheets

(56) References Cited

U.S. PATENT DOCUMENTS

| | | | |
|---|---|---|---|
| 2008/0018180 A1* | 1/2008 | Neal | H02K 9/20 |
| | | | 310/54 |
| 2008/0018181 A1* | 1/2008 | Neal | H02K 9/20 |
| | | | 310/54 |
| 2008/0029506 A1* | 2/2008 | Neal | H05B 6/108 |
| | | | 219/628 |
| 2008/0224551 A1* | 9/2008 | Saban | H02K 9/12 |
| | | | 310/54 |
| 2009/0079279 A1 | 3/2009 | Cheng et al. | |
| 2010/0225183 A1 | 9/2010 | Baik et al. | |
| 2011/0304228 A1* | 12/2011 | Bradfield | H02K 1/20 |
| | | | 310/54 |
| 2013/0162071 A1* | 6/2013 | Chamberlin | H02K 9/22 |
| | | | 310/64 |
| 2014/0265662 A1* | 9/2014 | Shoykhet | H02K 1/20 |
| | | | 310/59 |
| 2014/0300220 A1 | 10/2014 | Marvin | |
| 2015/0381010 A1* | 12/2015 | Kobes | H02K 15/02 |
| | | | 310/54 |
| 2017/0373545 A1 | 12/2017 | Zhong et al. | |

\* cited by examiner

ELECTRICAL MACHINE WITH COOLING CHANNEL

TECHNICAL FIELD

The present application relates generally to electrical machines and more particularly, but not exclusively, to electrical machines that include cooling channels.

BACKGROUND

Electrical machines remain an area of interest. Some existing machines have various shortcomings, drawbacks and disadvantages relative to certain applications. For example, in some electrical machine configurations, the performance and/or power density may be improved. Accordingly, there remains a need for further contributions in this area of technology.

SUMMARY

Embodiments of the present invention include unique electrical machines that include cooling channels therein. Other embodiments include apparatuses, systems, devices, hardware, methods, and combinations for electrical machines with cooling channels. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
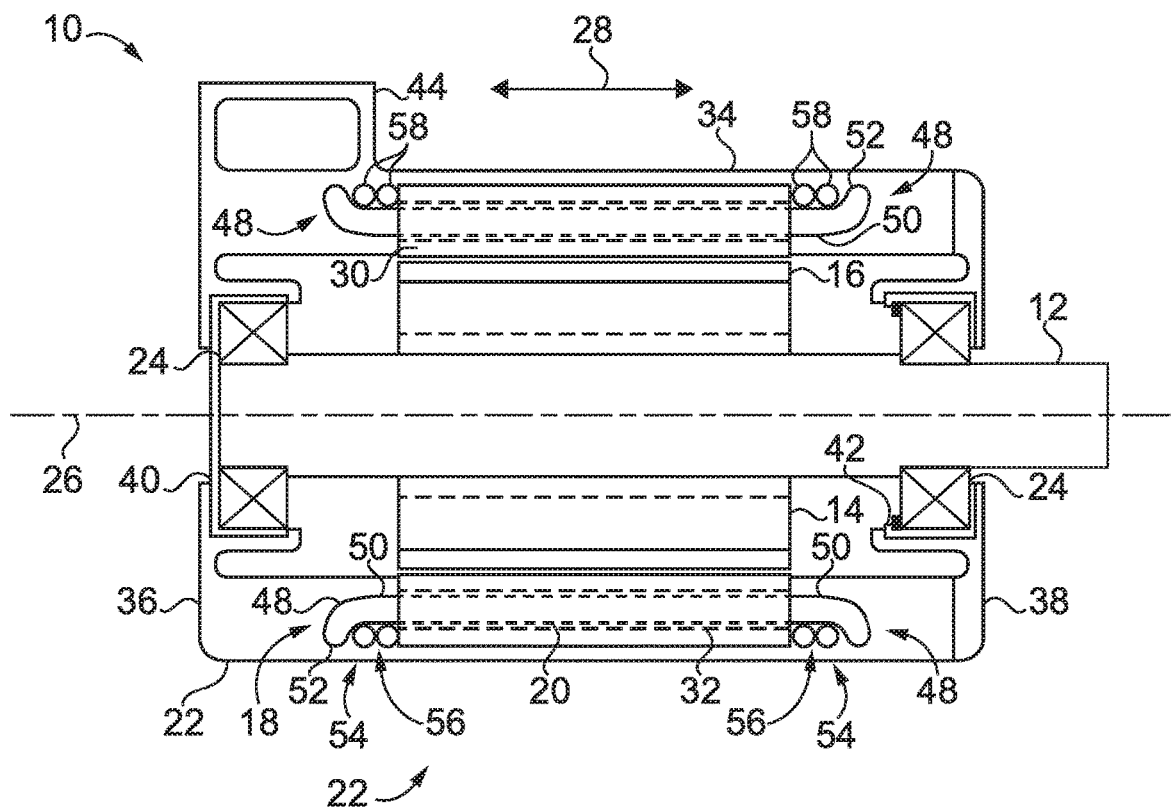
FIG. 1 schematically illustrates some aspects of a non-limiting example of a totally enclosed water cooled (TEWC) electrical machine in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to the drawings, and in particular FIG. 1, some aspects of a non-limiting example of an electrical machine 10 in accordance with an embodiment of the present invention are schematically depicted. In one form, electrical machine 10 is a permanent magnet motor. In other embodiments, electrical machine 10 may be a motor and/or a generator, and may be any type of electrical machine, such as a switched reluctance, synchronous reluctance, or permanent magnet assisted reluctance motor, a permanent magnet motor, or an induction motor or any other type of motor, generator or motor/generator. In various embodiments, electrical machine 10 may be a radial flux machine, an axial flux machine or a machine having a three-dimensional (3D) flux path.

In one form, electrical machine 10 is an industrial electrical machine, e.g., an industrial motor. In other embodiments, electrical machine 10 may not be an industrial electrical machine. In a particular form, electrical machine 10 is an industrial totally enclosed water cooled (TEWC) wash-down machine constructed for use in the food and beverage industry, and subject to being washed down with water, detergents, solvents, e.g., organic solvents, and other fluids, at least some of which may be or contain corrosive fluids and/or volatiles. An industrial electrical machine is an electrical machine that is fixed in place, not handheld, and is used in industry for one or more of various industrial or other purposes, e.g., in industrial processes, in the fabrication of industrial or consumer chemicals, materials and goods, the provision of consumer and industrial services, manufacturing facilities, municipalities, material handling and other industry, and is not an electrical machine used in consumer products, such as tools used around the home and in home or home-like workshops, such as handheld or fixed electric drills, electric screwdrivers, electric saws and the like used in home and home-like workshops, home appliances, automobile accessory electrical machines, e.g., window motors, cabin heater or air conditioning fan motors or the like. Industrial electrical machines may operate in harsher environments, e.g., chemicals, solvents, contamination, etc., that consumer electrical machines are not subject to or capable of being subject to without excessive damage. An industrial electrical machine as that term is used herein includes electrical machines with power ratings up to about 5 hp, in some embodiments, and power ratings up to or in excess of about 25 hp in other embodiments. Electrical machine 10 includes a shaft 12, a rotor 14 having poles 16, a stator 18 including stator windings 20, a polymeric housing 22 and bearings 24. Shaft 12 and rotor 14 rotate about an axis of rotation 26, which defines an axial direction 28.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28.

Rotor 14 and stator 18 are in magnetic communication with each other. Each of rotor 14/poles 16 and stator 18 have a construction that is operative to direct magnetic flux toward and from each other for converting between electrical power and mechanical power. In various embodiments, rotor 14 includes operative sources of magnetic flux, e.g., bus bars, a squirrel cage, windings, and/or permanent magnets.

Polymeric housing 22 is constructed to house components of electrical machine 10, e.g., stator 18, rotor 14, most of shaft 12 and bearings 24. Polymeric housing 22 is constructed to structurally support electrical machine 10 and react torque loads generated by the electrical machine 10. In one form, polymeric housing 22 is the external housing of electrical machine 10, separating the internal components of electrical machine 10 from the environment in which electrical machine 10 is installed. In other embodiments, housing 22 may be an intermediate housing, e.g., disposed within a housing structure that separates electrical machine 10 from the environment in which it is installed. In still other embodiments, housing 22 may define both an external and an intermediate or internal housing.

Polymeric housing 22 is made of or formed by a polymeric material. In a more particular form, polymeric housing 22 is made of a thermoplastic. In other embodiments, polymeric housing 22 may also or alternatively be formed of one or more other polymeric materials. The polymeric material use to form polymeric housing 22 is constructed and configured to provide chemical resistance to a wide range of chemicals and/or to particular chemicals for selected applications, including strong mechanical performance, and thermal and chemical or environmental stability. Examples of materials that may be used to form housing 22 include one or more polymer materials, or polymer composite materials, including but not limited to acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyethylene, polypropylene, polyetherimide (PEI), polyphenylene sulfide (PPS), polyether ether ketone (PEEK), polyphthalamide (PPA), polyoxymethylene (POM), phenolformaldehyde (PF), unsaturated polyester (UP), polyurethane (PUR and PU), polyimide, polyamide, polyvinyl alcohol, polyvinylidene chloride, polyacrylonitrile and polyalkylene paraoxybenzoate. In some embodiments, the composite can include a variety of types of fibers, including but not limited to carbon fiber, glass fiber, wool, silk, cotton, rayon, cellulose, cellulose acetate, flax, ramie, jute and aramid fibers. In some embodiments, additives can be used to improve the qualities of the materials, including but not limited to the mechanical and thermal stability, chemical resistance, insulation property and flammability. The additives can include, but are not limited to, ceramics, alumina, calcium silicate, flame retardants and clays.

Stator 18 includes a laminated stator core 30. Stator windings 20 are disposed within passages 32 in laminated stator core 30. In one form, stator windings 20 are copper conductors. In other embodiments, aluminum and/or other conductor materials may be employed in addition to or in place of copper. Windings 20 are constructed for magnetic communication with poles 16. Stator 18 is overmolded into and partially encapsulated by polymeric housing 22, e.g., by a central portion of polymeric housing 22, referred to as stator band 34. The term, "overmolded" as used herein refers to a characteristic structural form wherein the components are said to be overmolded if one of the components is a molded component, formed by molding, e.g., the polymeric material forming housing 22, and is molded to encapsulate another of the components to a degree that certain geometric features of the other component are encapsulated by or contained wholly or partially within or constrained by certain geometric features of the molded component, such that the components are locked to each other and cannot be removed from each other without fracturing or damaging one or more of the components. Overmolding may be achieved by, for example, injection molding, compression molding or other molding processes. In the illustrated embodiment, laminated stator core 30 is overmolded into polymeric housing 22, e.g., into stator band 34, and partially encapsulated by polymeric housing 22 within the polymeric material forming polymeric housing 22.

In one form, housing 22 is a unitary nonmetallic housing having an integral endplate 36 disposed at one end of stator band 34. In some embodiments, housing 22 may be metallic. In some embodiments, endplate 36 may not be integral, but rather, may be attached or affixed to stator band 34. A second endplate 38 is attached to housing 22 at the opposite end of stator band 34. In one form, endplate 36 is a non-drive end endplate, and endplate 38 is a drive-end endplate, or pulley endplate. In other embodiments, endplate 36 may be the drive-end endplate integral with stator band 34, and endplate 38 may be the non-drive end endplate. In some embodiments, housing 22 also includes an integral conduit box 44. In other embodiments, conduit box 44 may be attached, e.g., glued or welded or otherwise affixed or attached to stator band 34 and/or endplate 36 and/or endplate 38. Still other embodiments may not include a conduit box.

Overmolded with endplates 36 and 38 are respective sleeves 40 and 42. In one form, sleeves 40 and 42 are metallic. In one form, sleeves 40 and 42 are constructed to increase the stiffness of respective endplates 36 and 38, e.g., by virtue of having flanges, the diameter and thickness of which is configured to increase the stiffness of respective endplates 36 and 38. In addition, the axial length and/or other features of sleeves 40 and 42 may be configured to add stiffness to respective endplates 36 and 38. In other embodiments, sleeves 40 and/or 42 may not be constructed to increase the stiffness of the respective endplates. In some embodiments, sleeves 40 and/or 42 may be formed of the same material as respective endplates 36 and/or 38, and may be formed as part of the respective endplates 36 and/or 38. In other embodiments, one or both of sleeves 40 and 42 may be nonmetallic, and may be any suitable material. In one form, respective bearings 24 are mounted in bearing sleeves 40 and 42, which are operative to pilot the respective bearings 24. In other embodiments, sleeves 40 and 42 may form parts of the corresponding bearings 24, e.g., may be outer races or journals. Sleeves 40 and 42 may be overmolded with respective endplates 36 and 38 by forming retaining features on the sleeves, inserting the sleeves in a mold, and injecting the polymeric material forming endplates 36 and 38 into the mold in an injection molding process to form the endplates, such that the endplate polymeric material flows around and encapsulates retaining features of the sleeve during the molding process, e.g., load-bearing features and/or other retention features.

Bearings 24 are constructed to react shaft 12 and rotor 14 axial or thrust loads in direction 28, and to react shaft 12 and rotor 14 radial loads perpendicular to axis of rotation 26. Housing 22 is constructed to enclose stator 18 and react loads associated with stator 18, e.g., torque loads and any other loads generated due to magnetic interaction between stator 18 and rotor 14 during the operation of electrical machine 10. Housing 22 is also constructed to react thrust loads delivered through bearings 24.

Stator band 34 is in self-locked engagement with laminated stator core 30. By "self-locked engagement," it is meant that the components so described are locked together absent the use of separate or other intermediate components to attain the condition of being locked together, e.g., absent the use of screws, bolts, retaining rings, clamps, or the like, and are not free to displace in any direction relative to each other, other than by such phenomena as mechanical stress/strain and/or relative thermal expansion or contraction, and in some situations, hygroscopic expansion and/or contraction. Self-locked engagement may be achieved in various manners. For example, self-locked engagement may be achieved where two or more components are over-molded together, or by employing an interference or press fit between two or more components to achieve self-locked engagement of the components. Laminated stator core 30 and stator windings 20 are overmolded with stator band 34 of polymeric housing 22, e.g., using an injection molding process. In some such embodiments, winding leads from stator windings 20 may be over-molded with stator band 34 and/or endplate 36 and/or conduit box 44.

Stator windings 20 include a winding overhang 48 on each side of laminated stator core 30. Winding overhangs 48 extends axially from laminated stator core 30, e.g., axially outward or away from laminated stator core 30. Winding overhangs 48 each include an axial portion 50 adjacent to and extending from laminated stator core 30. Axial portion 50 may include a small radial extent, e.g., less than about a 20° angle from axial direction 28. Winding overhangs 48 also each include a radially projecting end portion 52 extending radially from axial portion 50 and disposed opposite laminated stator core 30, i.e., disposed on the opposite side of axial portion 50 than laminated stator core 30. Radially projecting end portion 52 may include a small axial extent, e.g., less than about a 20° angle from a radial direction perpendicular to axial direction 28. In one form, radially projecting end portion 52 extends radially outward (in a direction outward from axis of rotation 26) from axial portion 50. In other embodiments, radially projecting end portion 52 may extend radially inward from axial portion 50.

Axial portion 50 and radially extending end portion 52 form a pocket 54 with laminated stator core 30. Pocket 54 is adjacent laminated stator core 30, axial portion 50 and radially extending end portion 52, and is surrounded on 3 sides by axial portion laminated stator core 30, axial portion 50 and radially extending end portion 52.

Figure 2:
FIG. 2 illustrates some aspects of a non-limiting example of a cooling channel in the form of a tube in accordance with an embodiment of the present invention.

Electrical machine 10 includes a plurality of cooling channels 56. In one form, cooling channels 56 are disposed adjacent to winding overhangs 48. For example, in the illustrated embodiment, cooling channel 56 are disposed circumferentially around overhang 48, e.g., circumferentially around and disposed adjacent to axial portion 50 of winding overhang 48. In a particular form, cooling channels 56 are disposed in pocket 54, axially between and adjacent to laminated stator core 30 and the radially projecting end portion 52 of winding overhang 48. In other embodiments, cooling channels 56 may also or alternatively be disposed elsewhere, e.g., circumferentially around laminated stator core 30. In one form, cooling channels 56 are tubes, e.g., metallic or nonmetallic tubes 58, such as copper tubes. A non-limiting example of cooling channels 56 in the form of tubes is illustrated in FIG. 2. In other embodiments, cooling channels 56 may be passages formed or cast (e.g., investment casted) into housing 22, e.g., in stator band 34.

Figure 3:
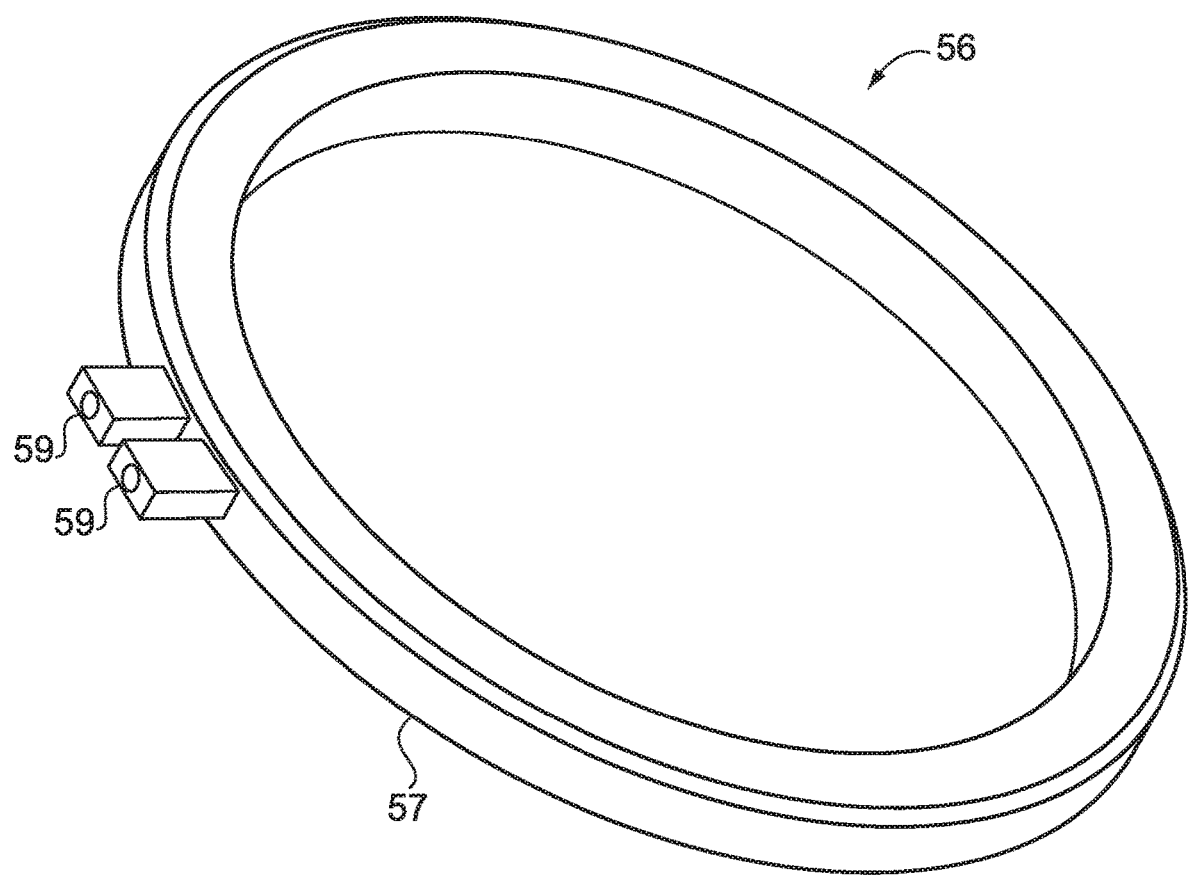
FIG. 3 illustrates some aspects of a non-limiting example of a prefabricated cooling channel in accordance with an embodiment of the present invention.

In still other embodiments, cooling channels 56 may be in the form of one or more prefabricated structures having one or more cooling passages therein, e.g., a prefabricated cooling jacket. A non-limiting example of cooling channels 56 in the form of a prefabricated structure, e.g., a prefabricated cooling jacket having a body 57 through which cooling fluid flows, is illustrated in FIG. 3. In some such embodiments and other embodiments, cooling channels 56 may be coupled or affixed to or otherwise disposed adjacent to the axial ends of laminated stator core 30, e.g., prior to winding insertion, wherein windings 20 are inserted into laminated stator core 30 after the installation or placement of cooling channels 56 onto or adjacent to laminated stator core 30, e.g., onto or adjacent to the axial ends of laminated stator core 30. Body 57 extends circumferentially around axial portion 50 of winding overhangs 48, and is disposed between radially projecting end portion 52 of winding overhang 48 and the axial end of laminated stator core 30. Fittings for fluid connections, e.g., for cooling fluid supply and discharge, may be provided, e.g., fittings 59 illustrated in FIG. 3. In some embodiments, the use of a prefabricated cooling channel 56 structure may make locating the fittings for fluid connection easier during placement of the stator assembly in the mold prior to molding, e.g., injection molding, for example, because the location of the fittings may be more precisely controlled during manufacturing.

By so disposing cooling channels 56 between laminated stator core 30 and radially projecting end portion 52 of winding overhang 48, cooling channels 56 provide or form a mechanical obstruction that provides mechanical support for windings 20, in particular, radially projecting end portions 52, to restrict or prevent stator windings 20 from moving axially or moving axially to an undesirable degree under the axial pressures stemming from the molding process, which may otherwise push windings 20 in axial direction 28 partially through laminated stator core 30. Cooling channels 56 may be constructed to provide a desired amount of stiffness and mechanical strength to restrict or prevent undesirable axial movement or deflection of windings 20, e.g., including winding overhangs 48, during the molding process. In some embodiments, by disposing cooling channels 56 circumferentially around axial portion 50 of winding overhangs 48, cooling channels 56 may also be constructed to provide radial support to winding overhangs 48 to prevent or restrict radial movement, e.g., outward radial movement, of winding overhangs 48 during the molding process.

Cooling channels 56 are constructed to pass a fluid, e.g., a liquid, for cooling electrical machine 10. In one form, the fluid is water. In other embodiments, the fluid may take other forms, and may be, for example, oil, air or another fluid. Cooling channels 56 are constructed to remove heat from electrical machine 10. For example, cooling channels 56 circulate the fluid, which extracts or removes heat from electrical machine 10. For instance, cooling channels 56 remove heat from stator 18, in some embodiments more particularly from stator windings 20, and in some embodiments, even more particularly from winding overhangs 48. Cooling channels 56 are fluidly coupled to a cooling system (not shown) that removes or extracts heat from the fluid cycled or passed through cooling channels 56.

In one form, cooling channels 56 are disposed within the polymeric material forming polymeric housing 22 and encapsulated, i.e., completely or wholly encapsulated, by the polymeric material forming polymeric housing 22 and positioned adjacent to the laminated stator core. In one form, e.g., in the form of tubes 58, cooling channels 56 are overmolded into or within polymeric housing 22, e.g., within stator band 34, and disposed within and encapsulated (i.e., completely or wholly encapsulated) by the polymeric material forming polymeric housing 22 and stator band 34. In one form, both winding overhangs 48 and cooling channels 56 are overmolded into housing 22, e.g., stator band 34, and disposed within the polymeric material forming the housing and encapsulated (i.e., completely or wholly encapsulated) by the polymeric material. In some embodiments, winding overhangs 48 and/or cooling channels 56 may alternatively be disposed within and surrounded by potting, e.g., in embodiments where they are not overmolded within polymeric housing 22 or wherein the housing 22 is not polymeric, e.g., wherein the housing is steel.

Referring also to FIG. 2, some aspects of a non-limiting example of a cooling channel 56 in the form of tube 58 in accordance with an embodiment of the present invention are illustrated. Tube 58 is constructed to circumferentially surround winding overhang 48, in particular axial portion 50 of winding overhang 48. In one form, tube 58 includes two elbows 60 for supplying cooling fluid to tube 58 and discharging cooling fluid from tube 58. The elbows are shown with set screws 62 used to close elbows 60 to prevent contamination of tube 58 prior to being overmolded into housing 22. Set screws 62 may be replaced with tubes and/or fittings that extend through housing 22 for attachment to a cooling system prior to overmolding of tubes 58.

In one form, tube 58 is helical, and extends around axial portion 50 of winding overhang 48 by two turns. In other embodiments, a single turn or any number of turns may be employed. In some embodiments, tube 58 may not be helical, but rather, may be one or more single loops or turns that may be coupled to inlet and discharge manifolds for supplying and discharging the cooling fluid.

In various embodiments, cooling channel 56 may be included in thermoset encapsulated machines or machines with a thermoplastic housing 22. The cooling provided by cooling channels 56 increases power density, e.g., for a given frame size. In addition, the cooling provided by cooling channels 56 allow the electrical machines to run at decreased temperatures, e.g., relative to natural convection cooled totally enclosed not ventilated (TENV) machines, which may increase the lifetime of the electrical machine, and which makes the polymeric housing stiffer and more creep resistant. The cooling provided by cooling channels 56 also reduces the temperature differential between metallic and polymeric components of the electrical machine.

Embodiments of the present invention include an electrical machine, comprising: a polymeric housing formed by a polymeric material and constructed to house components of the electrical machine, structurally support the electrical machine and react torque loads generated by the electrical machine; a stator overmolded into and partially encapsulated by the polymeric housing, the stator including a laminated stator core and a plurality of stator windings, the stator windings including a winding overhang extending from the laminated stator core; a rotor in magnetic communication with the stator; and a cooling channel disposed within the polymeric material forming the housing and encapsulated by the polymeric material and positioned adjacent to the laminated stator core, wherein the cooling channel is constructed to pass a fluid for cooling the electrical machine.

In a refinement, the cooling channel is disposed adjacent to the winding overhang.

In another refinement, the cooling channel is a tube overmolded by the polymeric material and encapsulated by the polymeric material.

In yet another refinement, the cooling channel is disposed circumferentially around the winding overhang.

In still another refinement, the winding overhang includes an axial portion adjacent to the laminated stator core and a radially projecting end portion extending radially from the axial portion and disposed opposite the laminated stator core, the axial portion and the radially projecting end portion forming a pocket with and adjacent to the laminated stator core, wherein the tube is disposed in the pocket between the laminated stator core and the radially projecting end portion of the stator overhang.

In yet still another refinement, the cooling channel is disposed circumferentially around and adjacent to the axial portion of the winding overhang.

In a further refinement, the cooling channel is helical.

In a yet further refinement, the cooling channel and the winding overhang are overmolded within and encapsulated by the polymeric material.

In a still further refinement, the electrical machine is constructed in the form of a totally enclosed water cooled machine, wherein the cooling channel is constructed to pass water for cooling the electrical machine.

Embodiments of the present invention include an electrical machine, comprising: a polymeric housing formed by a polymeric material and constructed to house components of the electrical machine, structurally support the electrical machine and react torque loads generated by the electrical machine; a stator including a laminated stator core and a plurality of stator windings, the stator windings including a winding overhang extending from the laminated stator core, the winding overhang including an axial portion adjacent to the laminated stator core and a radially projecting end portion extending radially from the axial portion and disposed opposite the laminated stator core; a rotor in magnetic communication with the stator; and a cooling channel disposed axially between the laminated stator core and the radially projecting end portion of the winding overhang, wherein the cooling channel is constructed to pass a fluid for cooling the electrical machine.

In a refinement, the cooling channel is disposed circumferentially around and adjacent to the axial portion of the winding overhang.

In another refinement, the cooling channel is overmolded into the polymeric housing, disposed within the polymeric material forming the housing and encapsulated by the polymeric material and positioned adjacent to the laminated stator core.

In yet another refinement, the cooling channel and the winding overhang are overmolded within and encapsulated by the polymeric material.

In still another refinement, the laminated stator core is overmolded into and partially encapsulated by the polymeric housing.

In yet still another refinement, the electrical machine is constructed in the form of a totally enclosed water cooled machine, wherein the cooling channel is constructed to pass water for cooling the electrical machine.

In a further refinement, the cooling channel is helical.

Embodiments of the present invention include an electrical machine, comprising: a housing constructed to house components of the electrical machine, structurally support the electrical machine and react torque loads generated by the electrical machine; a stator disposed in the housing, the stator including a laminated stator core and a plurality of stator windings, the stator windings including a winding overhang extending from the laminated stator core, the winding overhang including an axial portion adjacent to the laminated stator core and a radially projecting end portion extending radially from the axial portion and disposed opposite the laminated stator core; a rotor in magnetic communication with the stator; and a cooling channel disposed axially between the laminated stator core and the radially projecting end portion of the winding overhang, wherein the cooling channel is constructed to pass a fluid for cooling the electrical machine.

In a refinement, the cooling channel is disposed circumferentially around and adjacent to the axial portion of the winding overhang.

In another refinement, the housing is a polymeric housing formed by a polymeric material, and wherein the cooling channel is overmolded into the polymeric housing, disposed within the polymeric material forming the housing and encapsulated by the polymeric material.

In yet another refinement, the cooling channel and the winding overhang are overmolded within and encapsulated by the polymeric material.

Embodiments of the present invention include an electrical machine, comprising: a stator including a laminated stator core and a plurality of stator windings, the stator windings including a winding overhang extending from the laminated stator core, the winding overhang including an axial portion adjacent to the laminated stator core and a radially projecting end portion extending radially from the axial portion and disposed opposite the laminated stator core; a molded component; a rotor in magnetic communication with the stator; and a mechanical obstruction disposed axially between the laminated stator core and the radially projecting end portion of the winding overhang, wherein the mechanical obstruction is constructed to prevent or restrict axial movement of the stator windings during molding of the molded component.

In a refinement, the mechanical obstruction is constructed to form or include a cooling channel for cooling the stator windings.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An electrical machine, comprising:
   a polymeric housing formed by a polymeric material and constructed to house components of the electrical machine, structurally support the electrical machine and react torque loads generated by the electrical machine;
   a stator overmolded into and partially encapsulated by the polymeric housing, the stator including a laminated stator core and a plurality of stator windings, the stator windings including a winding overhang extending from the laminated stator core, wherein the winding overhang includes an axial portion adjacent to the laminated stator core and a radially projecting end portion extending radially from the axial portion and disposed opposite the laminated stator core, the axial portion and the radially projecting end portion forming a pocket with and adjacent to the laminated stator core;
   a rotor in magnetic communication with the stator; and
   a cooling channel formed by a tube overmolded within the polymeric material forming the housing and encapsulated by the polymeric material and positioned adjacent to the laminated stator core, wherein the cooling channel is constructed to pass a fluid for cooling the electrical machine, wherein the tube is disposed in the pocket between the laminated stator core and the radially projecting end portion of the stator overhang.

2. The electrical machine of claim 1, wherein the cooling channel is disposed adjacent to the winding overhang.

3. The electrical machine of claim 1, wherein the cooling channel is disposed circumferentially around the winding overhang.

4. The electrical machine of claim 1, wherein the cooling channel is disposed circumferentially around and adjacent to the axial portion of the winding overhang.

5. The electrical machine of claim 1, wherein the cooling channel is helical.

6. The electrical machine of claim 1, wherein the cooling channel and the winding overhang are overmolded within and encapsulated by the polymeric material.

7. The electrical machine of claim 1, constructed in the form of a totally enclosed water cooled machine, wherein the cooling channel is constructed to pass water for cooling the electrical machine.

8. An electrical machine, comprising:
   a polymeric housing formed by a polymeric material and constructed to house components of the electrical machine, structurally support the electrical machine and react torque loads generated by the electrical machine;
   a stator including a laminated stator core and a plurality of stator windings, the stator windings including a winding overhang extending from the laminated stator core, the winding overhang including an axial portion adjacent to the laminated stator core and a radially projecting end portion extending radially from the axial portion and disposed opposite the laminated stator core, the axial portion and the radially projecting end portion forming a pocket with and adjacent to the laminated stator core;
   a rotor in magnetic communication with the stator; and
   a cooling channel disposed axially between the laminated stator core and the radially projecting end portion of the winding overhang, wherein the cooling channel is constructed to pass a fluid for cooling the electrical machine, wherein the cooling channel includes a tube disposed in the pocket between the laminated stator core and the radially projecting end portion of the stator overhang that is encapsulated in the polymeric material of the polymeric housing.

9. The electrical machine of claim 8, wherein the cooling channel is disposed circumferentially around and adjacent to the axial portion of the winding overhang.

10. The electrical machine of claim 8, wherein the cooling channel is overmolded into the polymeric housing, disposed within the polymeric material forming the housing and encapsulated by the polymeric material and positioned adjacent to the laminated stator core.

11. The electrical machine of claim 8, wherein the cooling channel and the winding overhang are overmolded within and encapsulated by the polymeric material.

12. The electrical machine of claim 11, wherein the laminated stator core is overmolded into and partially encapsulated by the polymeric housing.

13. The electrical machine of claim 8, constructed in the form of a totally enclosed water cooled machine, wherein the cooling channel is constructed to pass water for cooling the electrical machine.

14. The electrical machine of claim 8, wherein the cooling channel is helical.

15. An electrical machine, comprising:
a housing constructed to house components of the electrical machine, structurally support the electrical machine and react torque loads generated by the electrical machine;
a stator disposed in the housing, the stator including a laminated stator core and a plurality of stator windings, the stator windings including a winding overhang extending from the laminated stator core, the winding overhang including an axial portion adjacent to the laminated stator core and a radially projecting end portion extending radially from the axial portion and disposed opposite the laminated stator core, the axial portion and the radially projecting end portion forming a pocket with and adjacent to the laminated stator core;
a rotor in magnetic communication with the stator; and
a cooling channel forming a mechanical obstruction disposed in the pocket axially between the laminated stator core and the radially projecting end portion of the winding overhang, wherein the cooling channel is constructed to pass a fluid for cooling the electrical machine, wherein the mechanical obstruction is constructed to prevent or restrict axial movement of the stator windings relative to the housing.

16. The electrical machine of claim 15, wherein the cooling channel is disposed circumferentially around and adjacent to the axial portion of the winding overhang.

17. The electrical machine of claim 15, wherein the housing is a polymeric housing formed by a polymeric material, and wherein the mechanical obstruction formed by the cooling channel is a tube that is overmolded into the polymeric housing, disposed within the polymeric material forming the housing and encapsulated by the polymeric material.

18. The electrical machine of claim 15, wherein the mechanical obstruction forming the cooling channel and the winding overhang are overmolded within and encapsulated by a polymeric material forming the housing, wherein the mechanical obstruction is constructed to prevent or restrict axial movement of the stator windings during molding of the housing with the polymeric material.

19. An electrical machine, comprising:
a stator including a laminated stator core and a plurality of stator windings, the stator windings including a winding overhang extending from the laminated stator core, the winding overhang including an axial portion adjacent to the laminated stator core and a radially projecting end portion extending radially from the axial portion and disposed opposite the laminated stator core;
a molded component;
a rotor in magnetic communication with the stator; and
a mechanical obstruction disposed axially between the laminated stator core and the radially projecting end portion of the winding overhang, wherein the mechanical obstruction is constructed to prevent or restrict axial movement of the stator windings during molding of the molded component.

20. The electrical machine of claim 19, wherein the mechanical obstruction is constructed to form or include a cooling channel for cooling the stator windings.

* * * * *